United States Patent Office 2,908,155
Patented Oct. 13, 1959

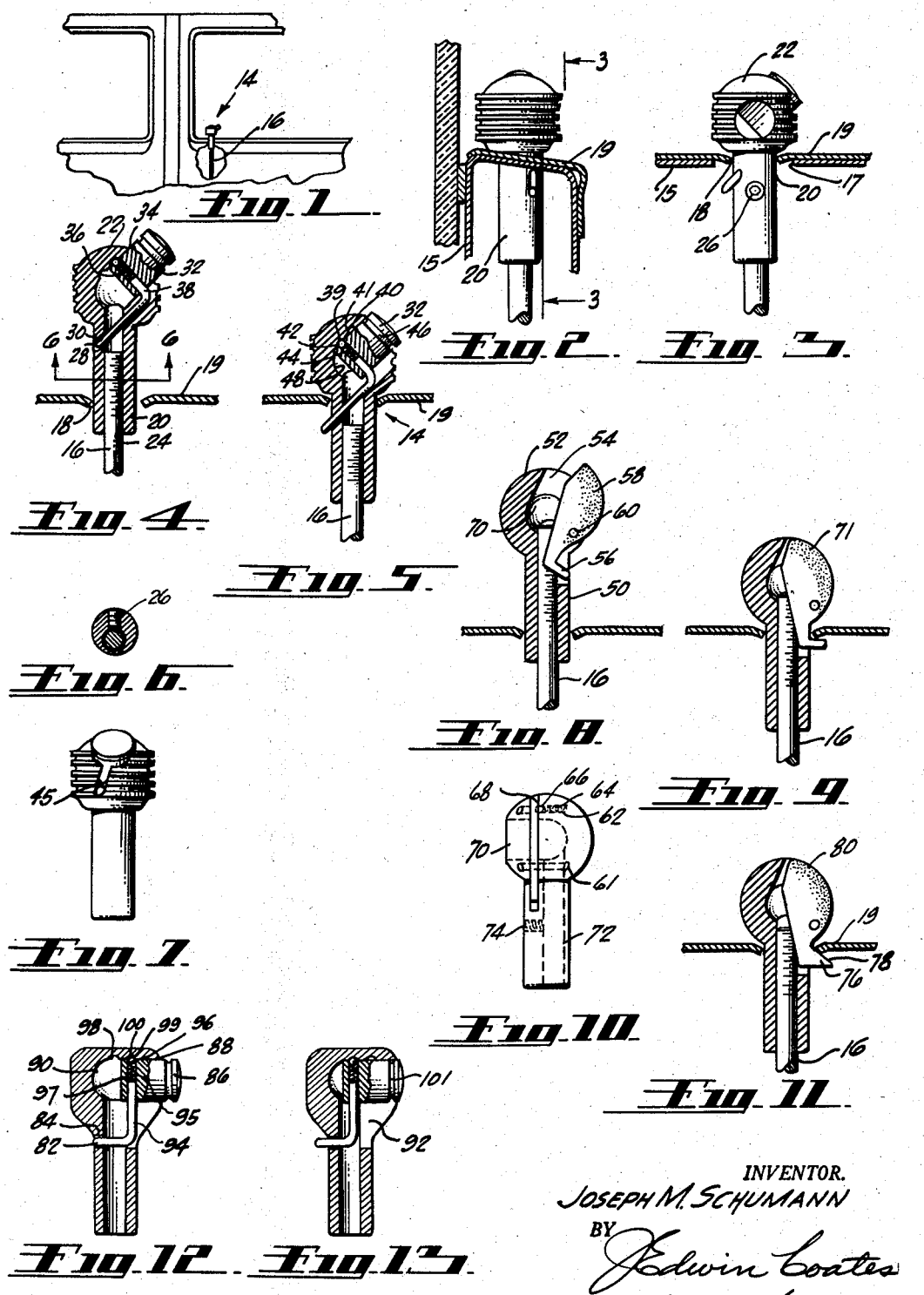

2,908,155
SAFETY DOOR LATCH

Joseph M. Schumann, Inglewood, Calif., assignor of twenty-five percent to Alta Engineering Company, Santa Monica, Calif., a limited partnership Application July 29, 1952, Serial No. 301,469

17 Claims. (Cl. 70—181)

This invention relates to automotive passenger vehicles and particularly to the door locking mechanisms of passenger automobiles.

The majority of automobiles now on the market are provided with door locking mechanisms which include a latch engageable with a keeper on the door frame and both interior and exterior devices for releasing the latch from engagement with the keeper. These mechanisms further include a lock which can be operated to prevent release of the latch by either of said devices to prevent unauthorized entry and to forestall accidental opening of the door from the interior. This lock is usually operated by a small lock operator in the form of a button, pin, or handle slidably mounted for passage through the window frame of the door. When the pin is pushed in or depressed it locks the latch mechanism, and when it is pulled out it unlocks it.

The problem of the safety of children in the rear seat of an automobile is rather minor in the case of a vehicle having only one door on each side of the body, both because the latch mechanism is usually inaccessible from the rear seat and because the passageway from the rear seat is effectively blocked when the front seat is occupied. However, in vehicles having two doors on each side, the rear door is exclusively for the use of the rear seat passengers and consequently it can be readily unlatched from the rear seat and, when open, it affords ready egress therefrom. While the lock button or pin, in depressed position, prevents accidental operation of the latch mechanism, a child alone in the rear seat can readily raise the button and then unlatch the door while the vehicle is in motion. If the child is gripping some part of the door at such time the sudden opening will catapult him or her thru the doorway. Every year a large number of such accidents occur, with serious and frequently fatal results.

Various schemes and devices have been proposed in the past to overcome this safety hazard, including the elimination of interior latch mechanism operators from the rear doors and the use of special bolts engaging the rear doors and held in position by the front doors when closed. All of these schemes have had disadvantages which have prevented their general adoption and it is the purpose of the present invention to provide a positive means for preventing unlatching of vehicle doors which may be readily mounted on existing vehicles or may be supplied with new ones, which is extremely easy to attach and to operate, and which does not interfere in any way with normal operation of the conventional mechanism.

The invention hereinafter described in detail is, in its presently preferred form, a direct substitution for the conventional lock button found on almost all modern four-door sedans, as described above. It is of substantially the same form as, and slightly larger than, the conventional lock button and is carried solely by the link member of the lock operating linkage which extends through the usual aperture in the door frame and associated window frame. It performs its safety locking function by engagement with the door frame or window frame or both, or it may engage a special stop member mounted on the door frame or window frame, and it may be selectively operated to prevent or to permit the unlatching of the door.

In its presently preferred form the safety lock is an elongate device having a head portion and a shank portion, the latter having a generally axially extending bore to receive the link member of the lock operating linkage and being provided with means to secure it to the link member. It has lateral dimensions slightly smaller than the access aperture in the frame so that it may slide freely therethrough and means are provided to increase the effective lateral extent of an intermediate portion of the shank after it has passed into the interior of the door so that it cannot be manually withdrawn, thus preventing undesired operation by a child.

The means for increasing the lateral extent of the shank is operated by an operating member in the form of a button or lever movably mounted in the head portion. In its unlocking position the operating member extends beyond the contour of the head portion and exposes a red colored area which serves as a warning of its unlocked condition. In its locking position it is substantially entirely within the head portion and substantially flush with the contour thereof. The signal area is concealed and there is no way to grip it manually to unlock it. A bore is formed in the head portion intersecting the path of travel of the operating member so that a portion of the latter is exposed within the bore when in locking position. The bore diameter is slightly larger than the width of the usual ignition key so that such a key may be inserted therein and turned to engage the operating member and force it outwardly to unlocking position. Spring and ball means are provided to yieldingly retain the operating member in its locking and unlocking positions.

In all modifications the latch may be selectively used. Hence, when there are adults in the rear seat the latch is left inoperative and the door is operated in conventional fashion. Since the unlocking feature is accomplished with the ignition key no special devices are necessary. The invention is applied individually to the lock operator of a single door and avoids the complexity and inconvenience of devices which depend for their operation upon the coaction of separate doors.

The presently preferred forms of the invention are illustrated in the accompanying drawing, in which:

Figure 1 is a fragmentary interior elevational view of a vehicle body showing the invention mounted on a door thereof;

Figure 2 is a sectional elevational view of a portion of the vehicle door showing the relative position and the manner of mounting the invention thereon;

Figure 3 is a combined sectional and elevational view taken substantially on line 3—3 of Figure 2;

Figure 4 is a vertical sectional view of the locking device of Figures 2 and 3 with a fragment of the frame shown to illustrate the unlocked condition;

Figure 5 is a view similar to Figure 4, showing the device in locked condition;

Figure 6 is a sectional view taken on the line 6—6 of Figure 4;

Figure 7 is a side elevational view of the device of Figures 1 to 5;

Figure 8 is a vertical sectional view similar to Figure 4, showing a modified form of the invention in unlocked condition;

Figure 9 is a view similar to Figure 8 showing the device in locked condition;

Figure 10 is a side elevational view of the device of Figures 8 and 9;

Figure 11 is a view similar to Figure 9, showing a modification of the detent portion;

Figure 12 is a vertical sectional view of another modification of the invention in unlocked condition; and Figure 13 is a view similar to Figure 12 showing the device in locked condition.

The invention generally comprises an elongate device 14 which, as will be seen in Figure 1, is attached to and carried solely by the link member 16 constituting the final element of the usual locking linkage found in automobile doors, which link member extends slightly thru apertures 17 and 18, Figure 3, in the door frame 15 and window molding 19 respectively for generally axial movement downward to lock and upward to unlock the door latch. The device directly replaces the conventional button and is of the same general size and shape, having a shank portion 20 which is a sliding fit in the aperture 18 and a head portion 22 which can be gripped by the fingers to raise and lower the device and the link member 16.

As best seen in Figures 4 and 6, the shank portion is provided with a generally axially extending bore 24, offset from center, to receive the link member 16 and with a headless set screw 26 in the thicker portion of the wall to provide an operative connection to the link member. The means to increase the effective lateral extent of the intermediate portion of the shank constitutes a locking pin or rod 28 which slides in bore 30 formed diagonally in the head and shank portions, its free end in unlocked condition being substantially flush with the wall of the shank portion.

The operating pin or rod 32 is slidably mounted in bore 34 in the head, formed substantially parallel to bore 30, and is provided near its inner end with a small cross bore 36 to loosely receive the bent inner end 38 of pin 28 to compensate for normal misalignment of the parts. It will be obvious that movement of the operating rod will control movement of the locking rod.

In order to prevent complete withdrawal of the operating rod and to yieldingly retain it in its locking and unlocking positions, the upper wall of the bore 34 is provided with a pair of spherical depressions 39 and 40 with a ramp 41 extending from the bottom of depression 40 towards depression 39. A locking ball 42 and compression coil spring 44 are mounted in cross bore 36, the spring urging the ball into the depressions for yielding locking purposes. The depth of depression 39 is about twenty-five percent of the ball diameter so that the ball can readily be cammed out of engagement, but the depth of depression 40 is about forty percent of the ball diameter. Such depth will lock the ball and prevent the operating button from being completely withdrawn from the head portion. Provision of the ramp permits the ball to be cammed out of the depression when the operating rod is moved in the locking direction.

The outer wall of the head portion is pinched or staked, as indicated at 45 in Figure 7, at the upper end of bore 30 to further assist in preventing withdrawal of the rods. An annular groove 46 is formed near the outer end of the operating rod and red color is applied thereto to serve as a warning signal. When the rod is fully depressed, this groove is concealed, indicating the locked condition of the device.

It will be seen in Figure 5 that when the device 14 is pushed downwardly to lock the door latch and the operating rod 32 is pushed downwardly it extends or projects pin 28 from the side wall of shank 20 below the molding or frame 19, thus increasing the effective lateral extent of the shank so that it cannot be manually withdrawn. Since rod 32 is now flush with the head portion it cannot be manually withdrawn and undesired unlocking of the door cannot be accomplished.

A generally horizontal bore 48 is formed in the head portion to intersect bore 34, and the rod 32 extends thereinto in locking position. Bore 48 is just slightly larger than the width of a standard ignition key, which is inserted therein and turned to engage the inner end of rod 32 and force it outwardly to unlocking position. Thus the condition of the locking device is completely under the control of the driver of the automobile.

Figures 8, 9, and 10 illustrate a modification in which a shank portion 50 and head portion 52 are provided with a vertical slot 54 in which is located a combined detent and operating member having a detent portion 56 and an operating portion 58, and pivotally mounted by means of cross pin 60 carried in bore 61. After the device is pushed down to the position of Figure 9, the operating portion 58 is pushed in to flush position, moving the detent portion 56 out under the frame or molding to its locking position.

To yieldingly retain the lever in its two positions, a bore 62 is formed in the head and a spring 64 and ball 66 are located therein. The lever is provided with a pair of depressions 68, one of which is engaged by the ball in each position of the lever. A generally horizontal bore 70 is formed in the head to receive a key to force the lever outwardly as described in connection with the previous modification. A part of the surface of operating portion 58 is provided with red coloring as indicated at 71 to serve as a warning signal in unlocking position.

Bore 72 is provided to receive the link member 16 and a set screw 74 locks it in place in the same manner as in Figure 6. In some instances the device of Figures 1 to 7 requires cutting off a part of the end of link member 16 because it would be so long as to interfere with the operation of rod 32, but in the present modification, the member 16 may extend up into the head 52 because the operating portion 58 is narrow and offset from center.

The modification of Figure 11 is the same in all respects as the form of Figures 8, 9, and 10 except that the detent portion 76 is provided with a downwardly and outwardly extending upper cam surface 78. If the device is in the position of Figure 11 with the automobile door open and the door is suddenly closed, the excessive upward force applied to member 16 combined with the effect of cam surface 78 in contact with frame 19 will force the lever 80 to unlocking position and prevent damage to the locking linkage within the door.

The form of Figures 12 and 13 is quite similar to that of Figures 1 to 7 but the pin 82 is carried in a horizontal bore 84 in the shank and the rod 86 is carried in a horizontal bore 88 in the head, intersecting the key receiving bore 90. The two horizontal bores are connected by a slot 92 providing space for the pin 82 and its bent portion 94. Spring 95 and ball 96 are carried in cross bore 97 and engage the depressions 98 and 99 interconnected by ramp 100. As in the first modification, movement of rod 86 inward to a locking, flush position will project pin 82 to increase the effective lateral extent of the shank for locking purposes. Annular groove 101 carries red coloring to serve as a warning indicator.

It will be apparent that various changes and modifications can be made in the features of construction of the locking device disclosed hereinabove without departing from the spirit of the invention and it is intended that all such changes and modifications shall be embraced within the scope of the following claims.

I claim:

1. Locking mechanism for the lock of a vehicle body door provided with a frame member having an aperture for access to a generally axially movable link member of a locking linkage, comprising: a handle member including a shank adapted to be mounted for generally axial movement to locking and unlocking positions in said aperture and an operating head at one end of said shank; means carried by another portion of said shank for operative engagement with said link member; means carried by said handle member and movable to increase the effective lateral extent of said shank to prevent withdrawal thereof from locking position through said aperture; and manually operable means carried by said operating head to actuate said last mentioned means, said manually operable means extending beyond the contour of said head in unlocked position and being movable into substantially flush relation therewith in locked position; and means in said handle member to provide for reverse operation of said manually operable means.

2. Locking mechanism for the lock of a vehicle body door provided with a frame member having an aperture for access to a generally axially movable link member of a locking linkage, comprising: a handle member including a shank adapted to be mounted for generally axial movement to locking and unlocking positions in said aperture and an operating head at one end of said shank; means carried by another portion of said shank for operative engagement with said link member; means carried by said handle member and movable to increase the effective lateral extent of said shank to prevent withdrawal thereof from locking position through said aperture; manually operable means carried by said handle member to actuate said last mentioned means to locking condition; and access means in said head for an instrument to cause reverse operation of said manually operable means.

3. A safety lock for attachment to the end of a slender elongate link member of a locking linkage, comprising: an elongate member having a head portion and a shank portion, the latter being of substantially uniform lateral dimensions throughout its length; a generally axially extending bore in said shank portion to receive the free end of said link member; means carried by said shank portion to engage said link member in operative relation; detent means projectable from an intermediate part of the wall of said shank portion to increase the effective lateral extent thereof; a member extending beyond the contour of said head portion in unlocked position and movable into substantially flush relation therewith in locked position and connected to said detent means to project same when said member is moved into said substantially flush relation; and means in said head to provide for reverse operation of said last mentioned member.

4. A safety lock for attachment to the end of a slender elongate link member of a locking linkage, comprising: an elongate member having a head portion and a shank portion, the latter being of substantially uniform lateral dimensions throughout its length; a generally axially extending bore in said shank portion to receive the free end of said link member; means carried by said shank portion to engage said link member in operative relation; an opening formed in the wall of said shank portion; detent means projectible through said opening to increase the effective lateral extent of said shank portion; a member extending beyond the contour of said head portion in unlocked position and movable into substantially flush relation therewith in locked position and connected to said detent means to project same when said member is moved into said substantially flush relation; and means in said head to provide for reverse operation of said last mentioned member.

5. Locking mechanism for use with a vehicle body door having lock mechanism and a lock operating linkage in the interior thereof including a generally axially movable link member, said door having a frame portion with an aperture therethrough and said link member having a free end extending through said aperture to the exterior of said door, said mechanism comprising: a handle member including a shank adapted to be mounted for axial sliding movement in said aperture and having a lateral dimension slightly less than that of said aperture and an operating head at one end of said shank; means carried by another portion of said shank for operative engagement with said free end of said link member to apply axial forces thereto; means carried by said handle member and projectable laterally from the wall thereof within said door in one position of said shank to increase the effective lateral dimension of said shank and prevent its withdrawal through said aperture; and means movably mounted in said handle member and finger-operable to cause projection of said projectable means.

6. The mechanism as claimed in claim 5, and access means in said head for insertion of a tool for moving said movable means in a direction to retract said projectable means.

7. The mechanism as claimed in claim 5, said mechanism including a diagonally extending passage formed in said head and shank and opening through a wall of said shank; a locking rod slidable in said diagonally extending passage with its free end projectable through the opening in said wall; a second passage formed in said head substantially parallel to said first diagonally extending passage; an operating rod slidable in said second diagonally extending passage and connected to said locking rod; and means to yieldingly retain said operating rod in locking and unlocking positions.

8. The mechanism as claimed in claim 5, said mechanism including a diagonally extending passage formed in said head and shank and opening through a wall of said shank; a locking rod slidable in said diagonally extending passage with its free end projectable through the opening in said wall; a second passage formed in said head substantially parallel to said first diagonally extending passage; an operating rod slidable in said second diagonally extending passage and connected to said locking rod; and means to yieldingly retain said operating rod in locking and unlocking positions; said operating rod extending outwardly from said head in unlocking position and being substantially flush therewith in locking position; and means in said handle member to provide for reverse operation of said operating rod.

9. The mechanism as claimed in claim 5, said mechanism including a diagonally extending passage formed in said head and shank and opening through a wall of said shank; a locking rod slidable in said diagonally extending passage with its free end projectable through the opening in said wall; a second passage formed in said head substantially parallel to said first diagonally extending passage; an operating rod slidable in said second diagonally extending passage and connected to said locking rod; a third passage formed in said head and intersecting said second passage; said operating rod in locking position having its outer end substantially flush with the outer surface of said head and its inner end extending into said third passage; whereby it is adapted to be moved outwardly therefrom by manual manipulation of an instrument in said third passage.

10. The mechanism as claimed in claim 5, said mechanism including a first lateral passage formed in said shank substantially at right angles to its longitudinal axis and opening through a wall of said shank; a locking rod slidable in said first lateral passage and projectable through the opening in said wall; a second lateral passage formed in said head substantially parallel to said first lateral passage; an operating rod slidable in said second lateral passage and connected to said locking rod; and means to yieldingly retain said operating rod in locking and unlocking positions.

11. The mechanism as claimed in claim 5, said mechanism including a first lateral passage formed in said shank substantially at right angles to its longitudinal axis and opening through a wall of said shank; a locking rod slidable in said first lateral passage and projectable through the opening in said wall; a second lateral passage formed in said head substantially parallel to said first lateral passage; and operating rod slidable in said second lateral passage and connected to said locking rod; and means to yieldingly retain said operating rod in locking and unlocking positions; said operating rod extending outwardly from said head in unlocking position and being substantially flush therewith in locking position; and means in said handle member to provide for reverse operation of said operating rod.

12. The mechanism as claimed in claim 5, said mechanism including a first lateral passage formed in said shank substantially at right angles to its longitudinal axis and opening through a wall of said shank; a locking rod slidable in said first lateral passage and projectable through the opening in said wall; a second lateral passage formed in said head substantially parallel to said first lateral passage; an operating rod slidable in said second lateral passage and connected to said locking rod; a third passage formed in said head and intersecting said second lateral passage; said operating rod in locking position having its outer end substantially flush with the outer surface of said head and its inner end extending into said third passage; whereby it is adapted to be moved outwardly therefrom by manual manipulation of an instrument in said third passage.

13. The mechanism as claimed in claim 5, said mechanism including a slot formed in parts of said head and shank; a substantially planar lock member pivotally mounted in said slot and having detent and operating portions movable in opposite directions about the axis of its pivotal mounting; said detent portion being projectable outwardly of the wall of said shank into locking position upon movement of said operating portion into said head in substantially flush relation therewith; and means to yieldingly retain said lock member in locking and unlocking positions.

14. The mechanism as claimed in claim 5, said mechanism including a slot formed in parts of said head and shank; a substantially planar lock member pivotally mounted in said slot and having detent and operating portions movable in opposite directions about the axis of its pivotal mounting; said detent portion being projectable outwardly of the wall of said shank into locking position upon movement of said operating portion into said head in substantially flush relation therewith; and a downwardly and outwardly extending cam surface formed on said detent portion adapted upon engagement of an obstruction with excessive force to cam said detent portion to unlocking position.

15. The mechanism as claimed in claim 5, said mechanism including a slot formed in parts of said head and shank; a substantially planar lock member pivotally mounted in said slot and having detent and operating portions movable in opposite directions about the axis of its pivotal mounting; said detent portion being projectable outwardly of the wall of said shank into locking position upon movement of said operating portion into said head in substantially flush relation therewith; and a laterally extending bore formed in said head; said operating portion in locking position extending into said bore; whereby it is adapted to be moved outwardly therefrom by manual manipulation of an instrument in said bore.

16. The mechanism as claimed in claim 5, said mechanism including a slot formed in said handle member; a lock member pivotally mounted in said slot and having detent and operating portions movable in opposite directions about the axis of its pivotal mounting; said detent portion being projectable outwardly of the wall of said handle member into locking position upon movement of said operating portion into said handle member in substantially flush relation therewith; and means to yieldingly retain said lock member in locking and unlocking positions.

17. The mechanism as claimed in claim 5, said mechanism including a lock member pivotally mounted to said handle member about an axis substantially normal to the longitudinal axis of said handle member; said lock member having detent and operating portions movable in opposite directions about its pivotal axis; said detent portion being movable outwardly from the wall of said handle member into locking position upon movement of said operating portion toward said handle member; means to retain said lock member in locking position; and means to provide for return of the lock member to unlocking position.

References Cited in the file of this patent

UNITED STATES PATENTS

| | | |
|---|---|---|
| D. 168,424 | Schumann | Dec. 16, 1952 |
| D. 168,425 | Schumann | Dec. 16, 1952 |
| 1,335,943 | Emens | Apr. 6, 1920 |
| 1,638,688 | Fipps | Aug. 9, 1927 |
| 1,707,231 | Morin | Apr. 2, 1929 |
| 2,235,792 | Bauman | Mar. 18, 1941 |
| 2,582,237 | Dall | Jan. 15, 1952 |
| 2,708,845 | Trammell | May 24, 1955 |